(12) United States Patent
Hamon

(10) Patent No.: US 8,260,602 B1
(45) Date of Patent: Sep. 4, 2012

(54) TIMER ANALYSIS AND IDENTIFICATION

(75) Inventor: Gregoire Hamon, Boston, MA (US)

(73) Assignee: The Math Works, Inc., Natick, MA (US)

( * ) Notice: Subject to any disclaimer, the term of this patent is extended or adjusted under 35 U.S.C. 154(b) by 679 days.

(21) Appl. No.: 11/982,289

(22) Filed: Nov. 1, 2007

Related U.S. Application Data

(60) Provisional application No. 60/856,230, filed on Nov. 2, 2006.

(51) Int. Cl.
*G06F 9/45* (2006.01)
*G06F 17/50* (2006.01)
*G06F 9/44* (2006.01)

(52) U.S. Cl. ............ 703/22; 703/19; 717/104; 717/128; 717/130; 717/131; 717/135

(58) Field of Classification Search ................ 703/2, 19, 703/22; 717/124, 104, 128, 130, 131, 135; 716/6
See application file for complete search history.

(56) References Cited

U.S. PATENT DOCUMENTS

| | | | | |
|---|---|---|---|---|
| 4,393,446 A * | 7/1983 | Gurr et al. | ...................... | 713/502 |
| 4,894,823 A * | 1/1990 | Adelmann et al. | ............ | 370/252 |
| 5,043,880 A * | 8/1991 | Yoshida | ........................ | 712/201 |
| 5,170,359 A * | 12/1992 | Sax et al. | ......................... | 702/73 |
| 5,437,035 A * | 7/1995 | Horiuchi et al. | .............. | 717/149 |
| 5,469,553 A * | 11/1995 | Patrick | .......................... | 713/323 |
| 5,584,027 A * | 12/1996 | Smith | ........................... | 717/160 |
| 5,717,935 A * | 2/1998 | Zanders et al. | .............. | 713/300 |
| 6,048,209 A * | 4/2000 | Bailey | .......................... | 434/267 |
| 6,192,360 B1 * | 2/2001 | Dumais et al. | ........................ | 1/1 |
| 6,532,467 B1 * | 3/2003 | Brocklebank et al. | ............... | 1/1 |
| 6,751,788 B1 * | 6/2004 | Goser | .......................... | 717/127 |
| 6,938,249 B2 * | 8/2005 | Roediger et al. | .............. | 717/160 |
| 7,127,466 B2 * | 10/2006 | Brocklebank et al. | ............... | 1/1 |
| 7,251,673 B2 * | 7/2007 | Orlando et al. | ............... | 708/650 |
| 7,340,733 B2 * | 3/2008 | Archambault et al. | ........ | 717/151 |
| 7,346,484 B2 * | 3/2008 | Boehm | ......................... | 703/16 |
| 7,401,169 B2 * | 7/2008 | Holbrook | ....................... | 710/52 |
| 7,418,678 B1 * | 8/2008 | Ip et al. | ......................... | 716/106 |
| 7,428,731 B2 * | 9/2008 | Wu et al. | ...................... | 717/158 |
| 7,562,105 B2 * | 7/2009 | Liu et al. | ...................... | 708/270 |
| 7,921,411 B2 * | 4/2011 | Chockler et al. | .............. | 717/126 |
| 7,926,037 B2 * | 4/2011 | Leino et al. | ................... | 717/126 |
| 8,019,981 B1 * | 9/2011 | Metzgen | ....................... | 712/241 |
| 8,103,710 B1 * | 1/2012 | Lee | ................................ | 707/930 |
| 2001/0015965 A1 * | 8/2001 | Preston et al. | ................. | 370/338 |
| 2003/0078936 A1 * | 4/2003 | Brocklebank et al. | ........ | 707/101 |
| 2003/0088863 A1 * | 5/2003 | Tirumalai et al. | ............. | 717/158 |
| 2003/0115579 A1 * | 6/2003 | Archambault et al. | ........ | 717/152 |
| 2003/0152267 A1 * | 8/2003 | Pirim | ............................ | 382/170 |

(Continued)

OTHER PUBLICATIONS

"Program Control Flow-Iteration", Feb. 23, 2001, pp. 1-22.*

(Continued)

*Primary Examiner* — David Silver
*Assistant Examiner* — Kibrom Gebresilassie
(74) *Attorney, Agent, or Firm* — Nelson Mullins Riley & Scarborough LLP

(57) ABSTRACT

In an embodiment, a technique for identifying a timer in a graphical block diagram environment. According to the technique, one or more variables associated with an executable model in a graphical diagram environment are identified. One or more characteristics associated with the identified one or more variables are identified and the timer is identified based on the one or more characteristics.

32 Claims, 16 Drawing Sheets

U.S. PATENT DOCUMENTS

| | | | |
|---|---|---|---|
| 2003/0172062 A1* | 9/2003 | Brocklebank et al. | 707/4 |
| 2004/0010679 A1* | 1/2004 | Moritz et al. | 713/1 |
| 2004/0088332 A1* | 5/2004 | Lee et al. | 707/200 |
| 2004/0210592 A1* | 10/2004 | Ciolfi et al. | 707/101 |
| 2005/0071147 A1* | 3/2005 | Clarke et al. | 703/22 |
| 2005/0114416 A1* | 5/2005 | Liu et al. | 708/200 |
| 2005/0251791 A1* | 11/2005 | Hundt | 717/130 |
| 2005/0283743 A1* | 12/2005 | Mulholland et al. | 716/1 |
| 2006/0100858 A1* | 5/2006 | McEntee et al. | 704/10 |
| 2006/0225034 A1* | 10/2006 | Peck et al. | 717/106 |
| 2006/0288334 A1* | 12/2006 | Tian et al. | 717/127 |
| 2006/0294504 A1* | 12/2006 | Ramanujam et al. | 717/131 |
| 2007/0006222 A1* | 1/2007 | Maier et al. | 717/174 |
| 2007/0044030 A1* | 2/2007 | Hayles | 715/762 |
| 2007/0157180 A1* | 7/2007 | Tillmann et al. | 717/140 |
| 2007/0168988 A1* | 7/2007 | Eisner et al. | 717/126 |
| 2007/0203683 A1* | 8/2007 | Kornerup et al. | 703/19 |
| 2008/0028381 A1* | 1/2008 | Archambault et al. | 717/152 |
| 2008/0046871 A1* | 2/2008 | Nair | 717/140 |
| 2008/0098347 A1* | 4/2008 | Chockler et al. | 717/104 |
| 2008/0127064 A1* | 5/2008 | Orofino et al. | 717/108 |
| 2008/0127146 A1* | 5/2008 | Liao et al. | 717/150 |
| 2010/0088673 A1* | 4/2010 | Chen et al. | 717/110 |
| 2010/0250854 A1* | 9/2010 | Ju | 711/125 |

OTHER PUBLICATIONS

"Program control flow-Iteration" Feb. 23, 2001, pp. 1-22.*

* cited by examiner

```
110 ——— X = 0
120 ——— WHILE (X < 10) {
130 ———     PERFORM_OPERATIONS
140 ———     X=X+1
150 ——— }
160 ——— PERFORM_OTHER_OPERATIONS
```

FIG. 1

```
510 ——————— X = 0
520 ——————— C = 1
530 ——————— START LOOP {
540 ————————————— IF (X > 20) {
550 ——————————————————— STOP LOOP
                        }
560 ——————————————— Y = X
570 ——————————————— X = Y + C
580 ————————— }
```

FIG. 5

| | |
|---|---|
| 610 —— | TIMER_RESET T(T,0); TIMER_START(T) |
| 620 —— | C = 1 |
| 630 —— | START_LOOP { |
| 640 —— | IF (TIMER_TEST (T, 20)) { |
| 650 —— | STOP LOOP |
| | } |
| 660 —— | Y = X |
| 670 —— | TIMER_UPDATE (T, C) |
| 680 —— | } |

FIG. 6

```
910 ──────   START_LOOP {
920 ─────────────   IF (X < 10) {
930 ──────────────────   X = X + 1
                     }
                     ELSE {
940 ────────────────       PERFORM_OPERATIONS
                     }
950 ──────    }
```

FIG. 9

```
1010 ——— X = 0
1020 ——— Y = 20
1030 ——— LOOP {
1040 ———————  X = X + 1
1050 ———————  IF (X > Y) {
1060 ——————————— PERFORM_OPERATIONS
                  }
1070 ———————  X = X + 1
1080 ———  }
```

FIG. 10

```
1110 ——— X = 0
1120 ——— Y = 20
1130 ——— LOOP {
1140 ———         X = X + 2
1150 ———         IF ((X – 1) > Y) {
1160 ———                 PERFORM_OPERATIONS
1170 ———         }
1180 ——— }
```

FIG. 11

TIMER ANALYSIS AND IDENTIFICATION

CROSS REFERENCE TO RELATED APPLICATIONS

This application claims the benefit of U.S. Provisional Patent Application Ser. No. 60/856,230, which was filed on Nov. 2, 2006 and which is hereby incorporated by reference in its entirety.

BACKGROUND

Smooth operation of modern-day software systems may often be ensured through rigorous verification processes. For a particular system, these processes may involve performing multiple tests on the system, which may include checking various system properties. The tests may be run without executing one or more portions of code in the software system. Regardless of how a software system may be verified, one goal often associated with verification is to achieve good test and/or analysis coverage. Here, the term "coverage" may refer to those portions of a software system that are examined by, e.g., analysis and/or tests used in the verification process. Typically, greater coverage often translates to more paths being tested in the software system. Usually, the more paths that are tested in the software system, the greater the assurance that the software system is operating as expected.

A software system may include a model that represents a system. The model may be textual and/or graphical, and may be executed to predict, analyze, verify and/or examine the behavior of the system. At any stage in a design, verification and/or analysis process of a model, it may be necessary to test and/or statically analyze the model. Various tools may be used for such analysis and testing, and one or more portions of the model may be provided to those tools via, e.g., various Application Program Interfaces (APIs). APIs used for testing and/or analysis may be designed in compliance with industry standards and/or may be custom-designed for a particular application or a set of applications (e.g., a proprietary design).

BRIEF DESCRIPTION OF DRAWINGS

The accompanying drawings, which are incorporated in and constitute a part of this specification, illustrate one or more embodiments of the invention and, together with the description below, explain the invention. In the drawings, FIG. 1 illustrates an example of a timer represented in pseudo-code;

FIG. 5 illustrates an example of a "nearly timer" represented in pseudo-code;

FIG. 6 illustrates an example rewriting of a representation of a "nearly timer";

FIG. 9 illustrates an example of an ordered timer represented in pseudo-code;

FIG. 10 illustrates an example of an unordered timer represented in pseudo-code;

FIG. 11 illustrates an example rewriting of an unordered timer as an ordered timer;

DETAILED DESCRIPTION

Figure 2:
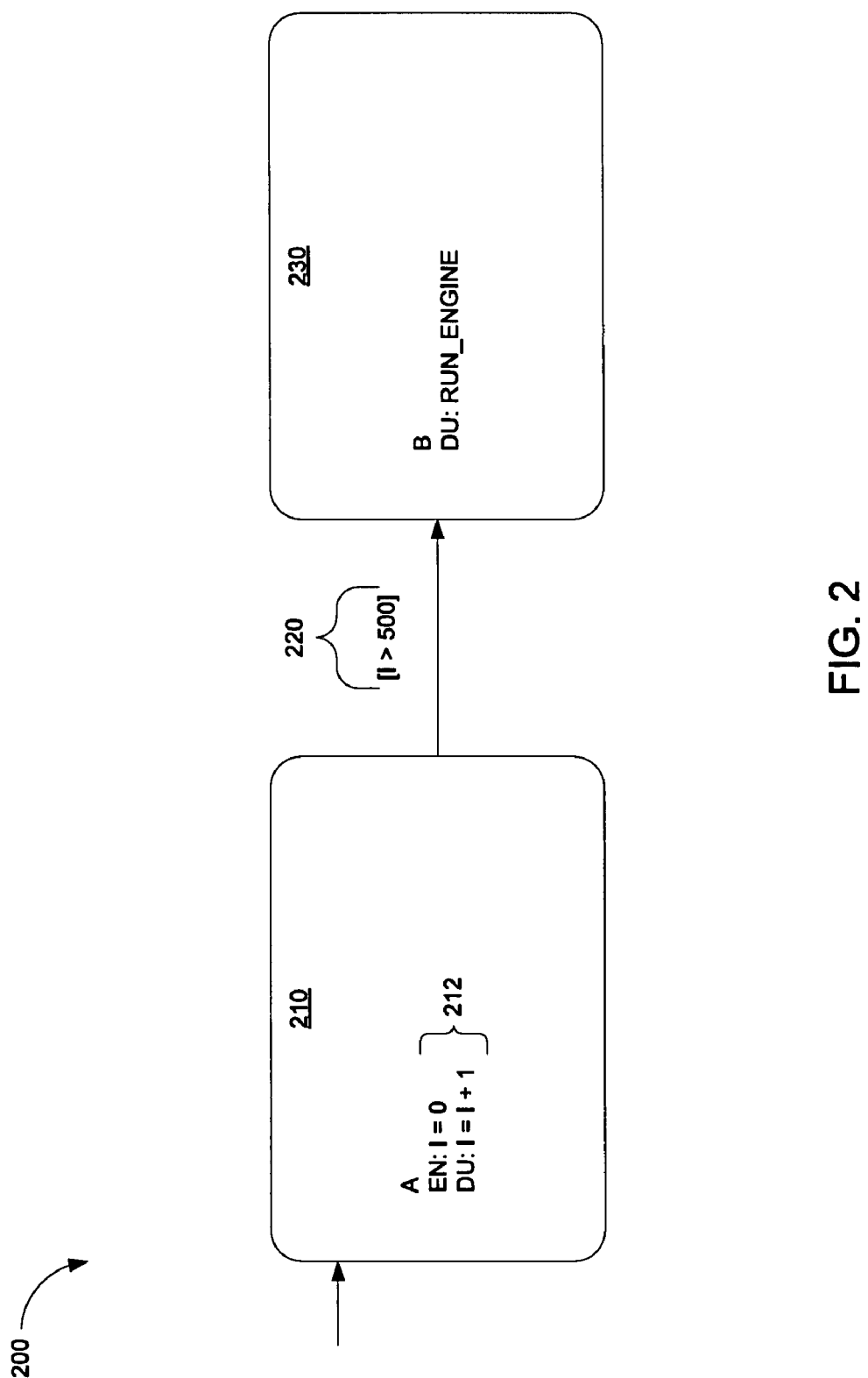
FIG. 2 illustrates an example of a timer represented in a state diagram.

Analyzing a system may be a complex process. The success of the analysis may depend on the size and/or complexity of the system under study. Simplification of the system may be helpful and may increase the likelihood that the analysis is successful. Simplification may involve replacing a part of the system with a functionally equivalent representation that is better suited for analysis. Choosing a satisfactory functionally equivalent representation may increase scalability, simplify the analysis, provide structure for analysis or provide other benefits. In addition, the precision of the analysis may be maintained by ensuring that the behavior of the functionally equivalent representation is unchanged from the original representation or varies from the original representation only in ways that do not negatively affect the quality of the analysis.

Analysis may refer to static or dynamic analysis techniques, such as, for example, formal analyses, like-model checking, theorem proving and linear programming, dynamic simulation, Monte Carlo techniques, etc. Analysis may also include other types of techniques that may be derived from the above techniques and/or combinations of the above techniques. Static analysis of a system may relate to a type of analysis that may be performed, for example, without executing a model that represents the system. Dynamic analysis of a system may relate to a type of analysis that may be performed, for example, during and/or after the execution of at least a portion of, e.g., a model of the system.

A system may be represented via a system representation that may be implemented in source code, a graphical modeling diagram, a graph, a model written in a Unified Modeling Language (UML), state diagram, etc. The system representation may reflect functional aspects of the system, its data flow, its control flow, its mathematical properties and so on. As part of static analysis of a system, it may be useful to analyze the system representation to demonstrate certain properties of the system and to identify test patterns for the system based on these properties. The test patterns may include, for example, test inputs that assess and/or improve test coverage of the system. In addition, the test patterns may include, for example, test input that demonstrate different aspects of the system's design or to confirm that certain properties of the system are valid (e.g., through mathematically based proofs).

Various techniques, such as code proving or model proving, may be used to analyze a representation of a system. However, these techniques may not be efficient at handling system designs that incorporate one or more timers. The reason for this inefficiency may be that the complexity of the analysis may increase with the number of iterations and/or execution steps of the design due to the presence of the timers.

Timers by their nature often require a great number of iterations in order to test them well.

A system may contain one or more timers that are used to hold portions of the system in certain states for certain periods. The period may be measured in clock cycles, time units, event occurrences, etc. (e.g., other period measurements). Timers are sometimes referred to as "counters" and those terms are used interchangeably herein.

Timers may come in various types and may be expressed in textual, graphical and/or other forms. In addition, timers may be explicit or implicit. A timer may include (1) a storage which may be configured to hold a value associated with the timer, (2) an update operation (e.g., increment, decrement, etc.) which may be used to update the timer's value on a regular basis and (3) a test operation which may be used to test the timer's value to determine if it has reached a threshold value. The storage associated with the timer may be implemented in hardware or software (e.g., as a variable). The update operation may be an operation that updates the value contained in the storage on a periodic basis, an event basis, etc. The test operation may compare the value held by the storage to a predetermined threshold value to determine if a particular condition, associated with the timer, exists with respect to the threshold value (e.g., the timer has reach a value that is greater than the threshold value, less than the threshold value, matches the threshold value, etc.).

A timer may make one or more portions of a system unreachable or inactive until the timer reaches its threshold value. Such timers may complicate analysis and/or testing of the system, especially in cases where timers are not explicitly specified.

In an embodiment of the invention, a timer in a particular representation may be replaced with a predefined representation. The predefined representation may be specific or may be generic. The predefined representation may be defined by an Application Programming Interface (API). The API may be built into tools used to develop the model or code, provided separately (e.g., by a party providing the tools or a different party), etc. Many different representations may be used to represent timers, and in some embodiments of the invention it may be possible to change a representation to an alternative representation based on various preferences.

Embodiments of the present invention are not limited to particular types of timers. In general, a timer may involve a notion of (1) something that can be reset, (2) something that can be periodically updated (e.g., incremented, decremented, etc.), (3) something that can be tested and (4) something that after a certain number of updates or tests, may return a value (e.g., a logical "TRUE", a logical "FALSE", etc.).

The identification of timers in a system and their subsequent rewriting to a particular representation or conversion to a particular type may simplify the analysis and/or testing of the system. For example, as will be described further below, a timer's representation may be rewritten into a different representation in order to, e.g., make the representation more suitable for analysis and/or testing. Likewise, for example, as will be also described further below, a timer may be converted from an opaque type to a transparent type in order to, e.g., make a value associated with the timer accessible for analysis and/or testing.

It may be possible to specify formal parameters for a given timer that may be used during a static analysis and/or testing of a system. In an alternative usage, there may be a variety of tests available for a timer and those tests may be applied when a testing unit encounters a timer of a particular type or in a particular representation. Identification of the timers may also allow further optimizations of the system, especially in situations where the timers temporarily disable or make unreachable one or more portions of the system.

FIG. 1 illustrates an example of a timer represented in pseudo-code. The pseudo-code may represent part of an executable model that may be executed in a graphical diagram environment (e.g., a graphical block diagram environment). The executable model may, in turn, represent a system or a portion thereof ("system"). Referring to FIG. 1, variable "X" is configured to hold a value associated with the timer. At line 110, the value of "X" is initialized to zero. At line 120, the value of "X" is compared with a value of ten to determine if it is less than ten. If so, a "while" loop that begins at line 130 and ends at line 150 is entered. In the loop, at line 130, various operations associated with a "PERFORM_OPERATIONS" section are performed and at line 140, the value of "X" is updated by incrementing it by a value of one. If at line 120, the value of "X" is not less than ten (i.e., it is greater than or equal to ten), the loop is exited and control proceeds to line 160 where operations, associated with a "PERFORM_OTHER_OPERATIONS" section, are performed.

Note that in the above example, "X" is associated with an initialization operation (line 110), a test operation (line 120) and an update operation (line 140). Since operations 110, 120 and 140 may relate to a timer, the operations may be considered timer-related operations. Assuming "X" is not assigned a value in the "PERFORM_OPERATIONS" section, an analysis of "X" and its associated operations may determine that the pseudo-code illustrated in FIG. 1 contains a timer comprising the operations at lines 110, 120 and 140.

It should be noted that in the above example, the "while" construct is used merely for illustrative purposes. Other language constructs may be used, such as, for example, a "for" loop construct, a "foreach" loop construct, a "goto" construct or any other construct that allows for a repetition of a block of code.

FIG. 2 illustrates an example of a timer represented in a state diagram 200. The state diagram may represent part of an executable model that may be executed in a graphical diagram environment. The executable model may, in turn, represent a system or a portion thereof. Referring to FIG. 2, the diagram 200 comprises a first state 210 and a second state 230. The first state includes a variable "I", which may be configured to hold a value that is associated with the timer. After entering state 210, the value of "I" is initialized to zero. While in state 210, the value of "I" is incremented by one until the value of "I" is greater than five hundred, as indicated by transition condition 220. After the value of "I" is greater than five hundred, a transition to state 230 occurs. At state 230, "RUN_ENGINE" is performed.

Note that in the state diagram "I" is associated with an initialization operation (i.e., "I=0") an update operation (i.e., "I=I+1") and a test operation (i.e., I>500). As noted above, these operations may be considered timer-related operations. Analysis of "I" and its associated operations in the state diagram may determine that the state diagram 200 contains a timer.

Figure 3:
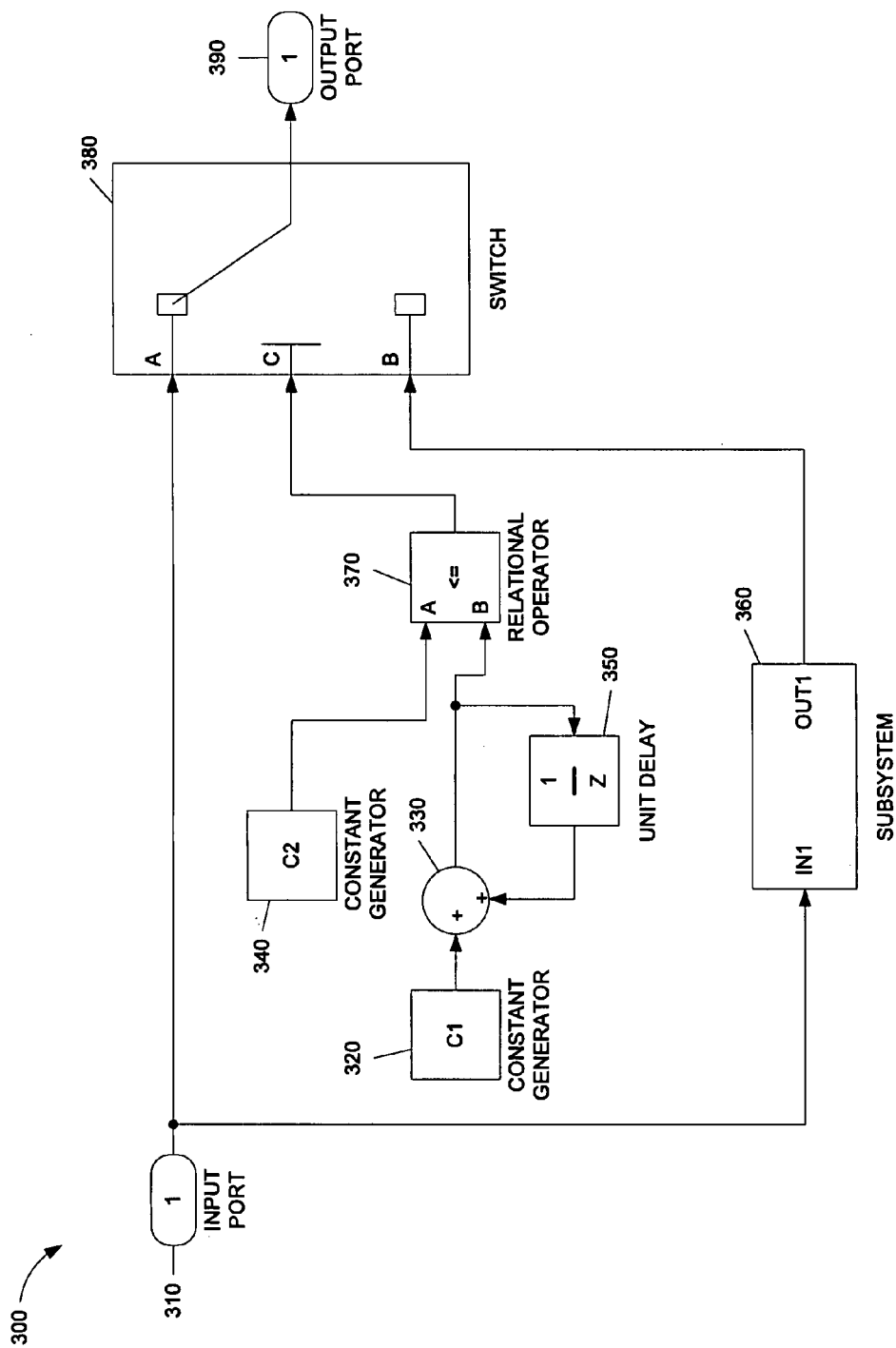
FIG. 3 illustrates an example of a timer represented in a block diagram.

FIG. 3 illustrates an example of a timer represented in a block diagram 300. The block diagram may represent part of an executable model that may be executed in a graphical diagram environment. The executable model may, in turn, represent a system or a portion thereof. Referring to FIG. 3, the diagram 300 comprises an input port 310, a first constant generator 320, an adder 330, a second constant generator 340, a unit delay 350, a subsystem 360, a relational operator 370, a switch 380 and an output port 390.

The input port 310 is configured to input a signal into the system. First constant generator 320 is configured to output a constant value, which in this example is represented by "C1". Likewise, the second constant generator 340 is configured to output a constant value, which in this example is represented by "C2". The unit delay 350 is configured to hold (e.g., store) a value that is input into the unit delay 350 and, after a predetermined delay, output the value from the unit delay 350. The adder 330 is configured to add the value outputted by the first constant generator 320 to the value outputted by the unit delay 350 to produce a sum. The sum is output by the adder 330 and fed to the relational operator 370 and the unit delay 350.

The relational operator 370 is configured to determine if a value at its "A" input, which in this example is the value that is output by the constant generator 340, is less than or equal to the value at its "B" input, which in this example is the value that is output by the adder 330. If so, the relational operator 370 outputs a logical "TRUE" signal. Otherwise, the relational operator outputs a logical "FALSE" signal. The subsystem 360 is configured to input a signal from the input port 310 at the subsystem's "IN1" input and to output a signal from the subsystem 360 at its "OUT1" output, based on the inputted signal. The signal outputted from the subsystem 360 is fed to a "B" input of the switch 380. Likewise, the signal inputted into the system via input port 310 is fed to an "A" input of switch 380. The switch 380 is configured to output either a signal present at its "A" input or a signal present at its "B" input based on a control signal that is present at its "C" input. In this example, the control signal is supplied by the relational operator 370.

Operationally, the value held by the unit delay 350 is initialized to some value (e.g., zero). After a delay, the unit delay 350 outputs the value to the adder 330. The value is input into the adder 330 which adds the value to "C1". The result of the addition is a sum that is transferred to the relational operator's "B" input and to the unit delay's input.

The relational operator 370 compares the sum with "C2". If "C2" is greater than the sum, the relational operator 370 outputs a logical "FALSE" signal which is fed to the control input "C" of the switch 380 and causes the switch 380 to output the signal that is present at its "A" input, which in this example is the signal that is output by the input port 310. Otherwise, if "C2" is less than or equal to the sum, the relational operator 370 outputs a logical "TRUE" signal, which causes the switch 380 to output a signal that is present at its "B" input, which in this example is the signal that is output by the subsystem 360. The outputted signal is output from the system at output port 390.

The sum that is fed to the unit delay 350 is stored by the unit delay 350. After a delay, the unit delay 350 begins a next iteration that includes outputting the stored sum from its output to the adder 330. The adder 330 adds "C1" to the sum to produce a new sum. The new sum is fed to the relational operator 370 and the unit delay 350, which process the new sum as described above. This cycle repeats causing the sum to increase by "C1" at each iteration.

Note that operations performed by the system include an initialization operation (performed by the unit delay 350), an update operation (performed by adder 330) and a test operation (performed by the relational operator 370). Also note that these operations are associated with the value that is held by the unit delay 350. Thus, analysis of this value and its associated operations may determine that the block diagram 300 contains a timer.

It should be noted that while a few example timers are illustrated in FIGS. 1-3, timer representations or variations are not limited to those, and may be simple or complex, textual and/or graphical, and may be represented in any number of possible representations.

Figure 4:
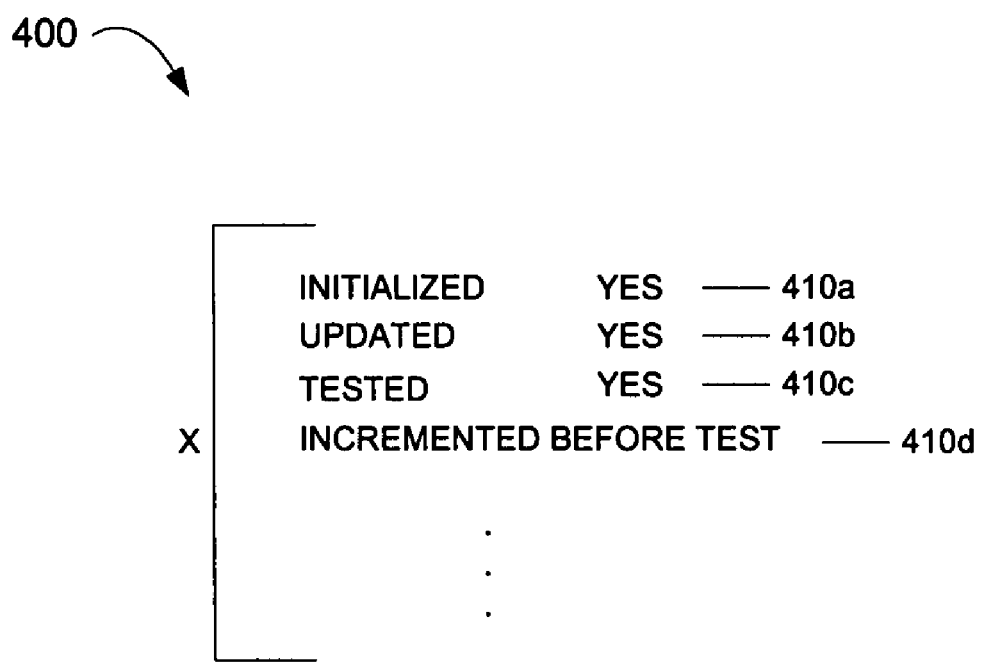
FIG. 4 illustrates an example of a record that may be used in the analysis of a variable.

FIG. 4 illustrates an example of a record 400 that may be used in the analysis of a variable. In this example, the record 400 is associated with a variable named "X". Referring to FIG. 4, the record 400 may contain various fields 410 that are configured to maintain information about characteristics associated with "X". These characteristics may include operations that are associated with "X". For example, field 410a may be used to maintain information about whether an initialization operation is performed on "X" (e.g., "X" is initialized to a particular value). Likewise, fields 410b and 410c may be used to maintain information about whether a timer update operation and a test operation is performed on "X", respectively. Field 410d may be used to indicate whether an update operation associated with "X" is performed before, after or both before and after a test operation associated with "X" is performed. It should be noted that other information associated with "X" may be maintained in the record 400. For example, record 400 may contain an indication of whether "X" is assigned a value within a body of a loop contained in a system containing "X".

In an embodiment, a separate record 400 may be maintained for each variable that is analyzed for a system. As will be described further below, the records 400 may be processed to determine if (1) one or more timers are contained in the system, (2) any of the timers should be rewritten and (3) any of the timers should be converted.

Various techniques may be used to identify variables that may be associated with timers. Such techniques may include static analysis techniques, such as, for example, abstract interpretation, partial evaluation, control flow analysis, optimizations, etc. The use of static analysis techniques may help identify timers that may not be readily apparent to, e.g., a user, certain test and/or analysis software, etc. For example, a system may contain a "nearly timer" which may not initially appear to be a timer, but, on closer inspection, may be actually identified as a timer.

FIG. 5 illustrates an example of a "nearly timer" represented in pseudo-code. The pseudo-code may represent part of an executable model that may be executed in a graphical diagram environment. The executable model may, in turn, represent a system or a portion thereof.

Referring to FIG. 5, "X", "C" and "Y" are variables. "X" holds a value that is associated with the timer. "C" is assigned a value is used to periodically update "X". "Y" is assigned the value of "X" at each iteration of a loop that begins at line 530 and ends at line 580.

At line 510, variable "X" is initialized to a value of zero. Likewise, at line 520, variable "C" is initialized to one. Within the loop, at line 540, a test is performed to determine if the value of "X" is greater than a threshold value, which in this example is twenty. If so, at line 550, the loop is stopped. Otherwise, at line 560, "Y" is assigned the value of "X". At line 570, "X" is incremented by the value of "C".

An analysis of the pseudo-code illustrated in FIG. 5 may employ various techniques (e.g., partial evaluation) that may determine that variable "Y" behaves as an indirection of variable "X" and that operations performed at line 570 include a timer update operation associated with variable "X". In addition, the analysis of the pseudo-code may determine that an initialization operation associated with "X" is performed at line 510 and a test operation associated with "X" is performed at line 540. Moreover, the analysis may determine that variable "C" is initialized to a particular value at line 520 and that the value does not change (i.e., it remains constant) throughout the operation of the loop. The above determinations may be reflected in one or more fields 410 contained in the records 400 that are maintained for the variables "X", "Y" and "C". In addition, the fields 410 may indicate that "X" is associated with an initialization operation (line 510), a test operation (line 540) and an increment operation (line 570).

In FIG. 5, after the variables have been analyzed, their associated records 400 may be analyzed to determine if the pseudo-code contains a timer. This analysis may include determining whether one or more particular variables are associated with timer-related operations. If so, the analysis may determine that a timer is contained in the pseudo-code.

Referring to FIGS. 4 and 5, a record 400 for variable "X" may indicate that "X" is initialized, updated, tested and incremented after the test. These indications may be made as a result of the analysis of operations performed at lines 510, 540 and 570. The analysis of the operations may include a partial evaluation of expressions at those lines to determine the type of operations performed at those lines. For instance, the analysis may include a partial evaluation of the expression at line 570 which results in finding that the value of "Y" is equivalent to the value of "X" and that an equivalent expression to "X=Y+C" expression at line 570 may be "X=X+C". From this equivalent expression, the analysis may further find that, since the value of "C" does not change in the loop, while in the loop "X" is being incremented by a constant and that the operation performed by the expression at line 570 may be a timer update operation associated with a timer. Taking the above into consideration the above characteristics associated with "X", the analysis may determine that "X" may be associated with a timer and, therefore, the analysis may determine that the pseudo-code illustrated in FIG. 5 may contain a timer where "X" is a value associated with the timer.

In some instances, it may be advantageous to rewrite a representation of a timer into a different representation in order to accommodate, for example, testing and/or analysis of the timer. The rewriting may include rewriting one or more timer-related operations into a notation that indicates functions performed by the timer-related operations. The notations may be used by various test and/or analysis techniques to readily identify the timer and its associated operations. For example, one technique that may be used to test a timer may involve initializing the timer to a particular value in order to expedite the timer's expiration. A test that incorporates this technique may (1) examine the notated representation to locate a notation that identifies an initialization operation associated with the timer and (2) modify the located notation to initialize the timer to the particular value.

FIG. 6 illustrates an example rewriting of a representation of the "nearly timer", illustrated in FIG. 5. The notation used to rewrite the "nearly timer", that is illustrated in FIG. 6, is an example of notation that may be used in an embodiment of the invention. It should be noted that in other embodiments of the invention other notations may be employed. In the example notation, the timer is referred to as "T".

Referring now to FIGS. 5 and 6, line 610 includes notations that indicate that the timer is reset and started. Specifically, at line 610, the notation "TIMER_RESET(T, 0)" indicates that an initialization operation is performed on the timer which resets the timer to a value of zero. This notation may reflect functions performed by the initialization operation at line 510. In addition, at line 610, the notation "TIMER_START (T)" indicates the timer is started.

At line 620, variable "C" is initialized. This line is equivalent to line 520. Likewise, line 630 denotes the beginning of a loop. Line 630 is equivalent to line 530. Line 640 includes the notation "TIMER_TEST(T, 20)" which indicates a test operation is performed on the timer. The notation at line 640 may reflect functions performed by the test operation at line 540. At line 650, the loop is stopped. This line is equivalent to line 550. At line 660 "Y" is assigned the value of "X". This line is equivalent to line 560.

Line 670 includes the notation "TIMER_UPDATE(T, C)" which indicates that an update operation, that involves updating the timer by the value of variable "C", is performed on the timer. The notation at line 670 may reflect functions performed by the update operation at line 570. Line 670 denotes the ending of the loop. Line 670 is equivalent to line 580.

Note that the notation used in FIG. 6 makes apparent operations performed by corresponding lines in FIG. 5 as those operations relate to an operation of the timer. For example, since analysis may show that "X" is associated with the timer, describing the assignment made to "X" at line 510 as "TIMER_RESET" makes it readily apparent that the assignment relates to resetting the timer. Likewise, describing the assignments made at lines 560 and 570 as "TIMER_UPDATE" makes it readily apparent that the operations performed at these lines relate to updating the timer. Making operations associated with a timer more apparent may make analyzing and/or testing the timer easier.

In an embodiment of the invention, "nearly timers" may be identified and combined and/or rewritten, e.g., into the above-described notation, to generate a more generally accepted representation of the timers. The generally accepted representation may be more conducive to analyzing and/or testing a system containing the "nearly timer" than if the "nearly timer" were not rewritten. Such rewriting may benefit from information derived through static analysis.

Figure 7:
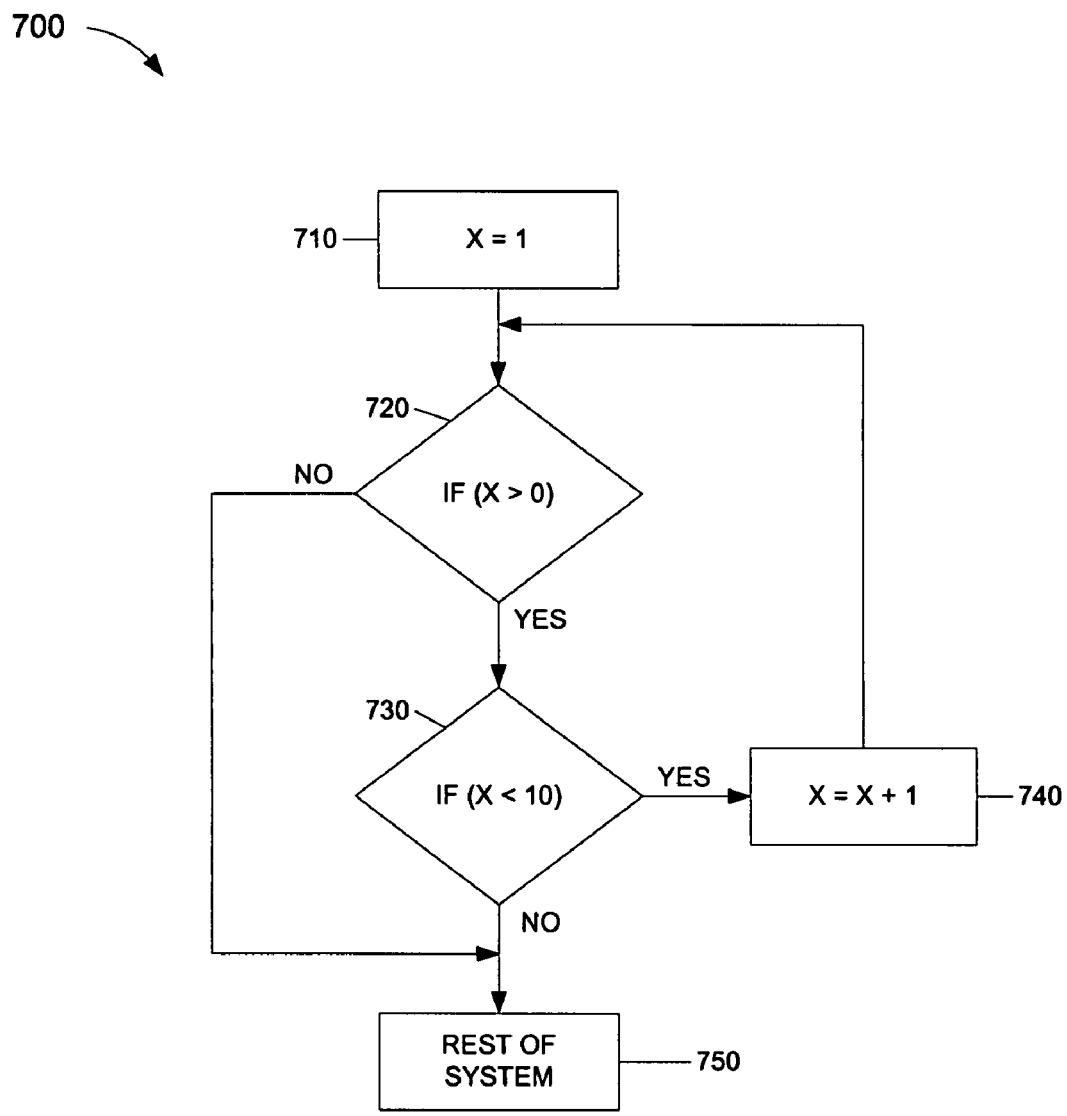
FIG. 7 illustrates an example of a control flow graph that includes a "nearly timer"

The above-described analysis can be used with a number of representations that may represent processing activities. For example, the above-described analysis may be applied to control flow graphs to identify timers contained in the graphs. FIG. 7 illustrates an example of a control flow graph 700 that includes a "nearly timer". The control flow graph 700 may represent part of an executable model that may be executed in a graphical diagram environment. The executable model may, in turn, represent a system or a portion thereof.

Referring to FIG. 7, variable "X" is associated with the "nearly timer". At block 710, the value of "X" is initialized to a value, which in this example is one. At block 720, the value of "X" is tested to determine if it is greater than zero. If not, the flow of control proceeds to the rest of the system, which is represented by block 750. Otherwise, the flow of control proceeds to block 730 where the value of "X" is tested to determine if it is less than ten. If so, the flow of control proceeds to block 740 where the value of "X" is incremented by one and the flow of control returns to block 720. Otherwise, if the value of "X" is not less than ten, the flow of control proceeds to block 750.

An analysis of the flow control graph in FIG. 7 may determine that the result of the test at block 720 will always be true because the value of "X" was initialized to a value greater than zero and remains greater than zero throughout execution of the control graph 700. As such, the analysis may determine that branch of the control flow graph may be disregarded and analysis of the remaining branch may result in determining that the portion of the system represented in the control flow graph 700 contains a timer.

Specifically, analysis of "X" may show that "X" is associated with an initialization operation (block 710), a test operation (block 730) and an increment operation (block 740). Analysis of these operations may determine that these operations are timer-related. In addition, analysis of the test operation at block 730 and the increment operation at block 740 may determine that these operations are involved in a loop that is controlled by the value of "X". More specifically, the analysis may determine that "X" is incremented until it reaches a threshold and after it reaches the threshold, the loop is exited. From these conclusions, the analysis may determine that "X" is associated with timer-related operations and that the timer-related operations in aggregate form a timer.

A rewritten version of control graph 700 may exclude block 720 and include notations, as described above, to identify various timer-related operations associated with the timer. For example, the initialization operation performed at block 710 may be rewritten to include "TIMER_RESET T(0)" where "T" represents the timer. Likewise, the test operation performed at line 730 and the update operation performed at line 740 may be rewritten to include "TIMER_TEST(T, 10)" and "TIMER_UPDATE(T,1)", respectively.

As discussed above, various static analysis techniques may be used to identify timer resets or initial value assignments. In an embodiment, a model may be rewritten in an intermediate form in order to simplify the analysis. The analysis may include partial evaluation techniques (e.g., constant folding, expression folding, etc.). The analysis may rewrite expressions associated with the variables into a more manageable intermediate form for analysis. For example, partial evaluation techniques may be used to rewrite the expression "X=23+40−63" to an equivalent intermediate form that may be more manageable for analysis, such as "X=0".

In an embodiment, assignment expressions may be rewritten in an abstract format for analysis. Moreover, compiler-type optimizations may be performed before and/or during the analysis to identify timers in order to simplify the analysis.

An embodiment may recognize multiple classes or types of timers. Those classes or types may have different properties and may be ranked in an order of their "desirability". Desirability may be based on how well the classes or types simplify analysis and/or rewriting of the timers. A more "desirable" class or type may be better structured in terms of constraints that may be applied and/or enforced on the class or type.

Timers may be classified as being either "opaque" or "transparent". An opaque timer relates to a timer whose value does not appear outside of the timer. The value may not be involved in operations other than those related to maintaining the timer. For example, timers shown in FIGS. 1-3 may be considered opaque timers because the values of the timers do not appear outside the timers. A transparent timer, on the other hand, may make the timer's value available outside the timer. Exposing a timer value outside the timer may allow operations outside the timer to use the value.

Figure 8:
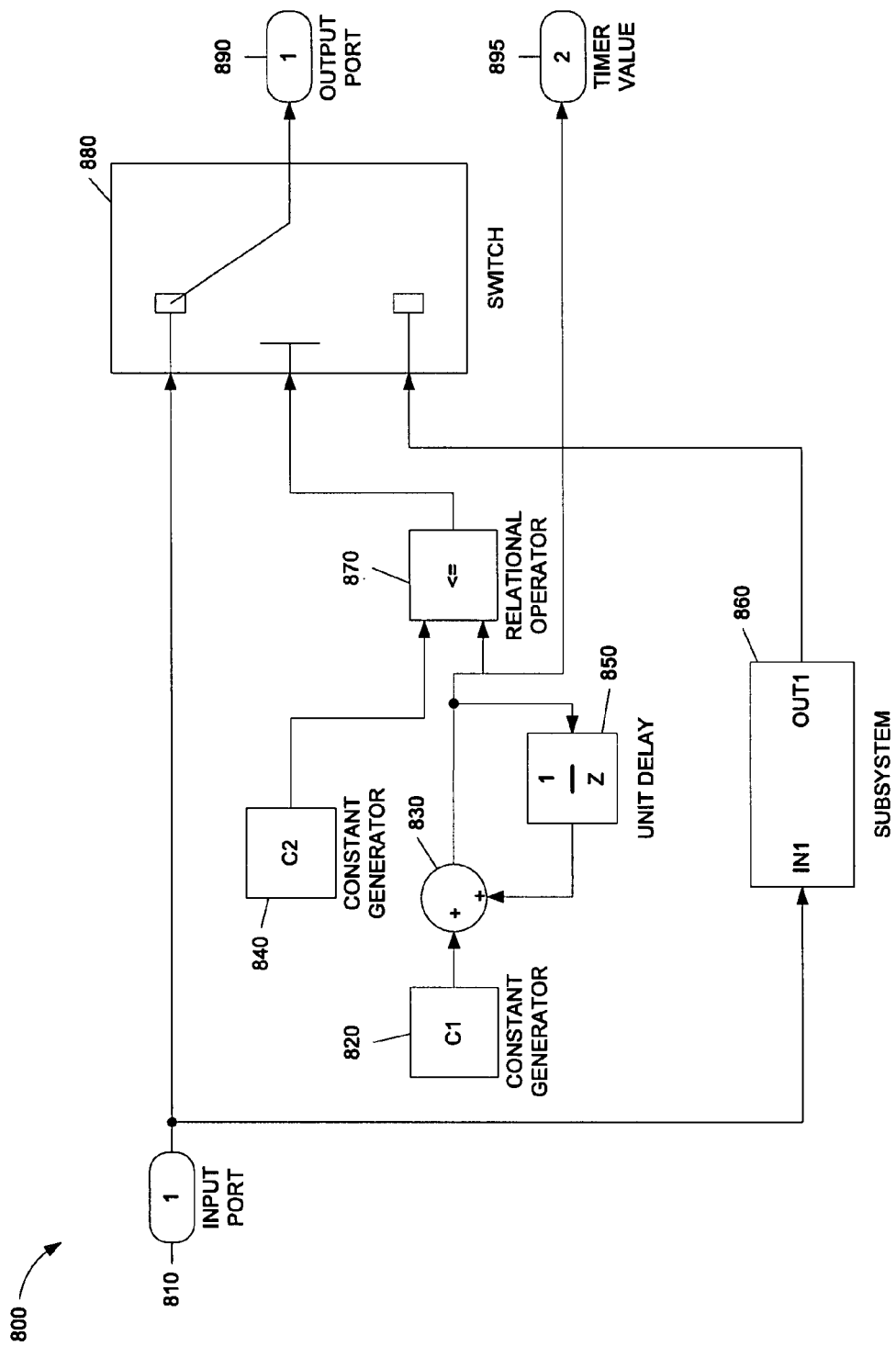
FIG. 8 illustrates an example of a transparent timer represented in a block diagram.

FIG. 8 illustrates an example block diagram 800 having a transparent timer. The block diagram 800 may represent part of an executable model that may be executed in a graphical block diagram environment. The executable model may, in turn, represent a system or a portion thereof. Diagram 800 comprises an input port 810, a first constant generator 820, an adder 830, a second constant generator 840, a unit delay 850, a subsystem 860, a relational operator 870, a switch 880, a first output port 890 and a second output port 895. Operations performed by input port 810, first constant generator 820, adder 830, second constant generator 840, unit delay 850, subsystem 860, relational operator 870, switch 880 and first output port 890 are similar to above-described operations performed by the input port 310, first constant generator 320, adder 330, second constant generator 340, unit delay 350, subsystem 360, relational operator 370, switch 380 and output port 390, respectively.

Analysis may indicate that the unit delay 850, the first constant generator 820, the second constant generator 840, the adder 830 and the relational operator 870 comprise a timer. The second output port 895 is an output port configured to output a signal that represents a value of the timer. This signal enables the value associated with the timer to be made visible outside of the timer which, in turn, makes the timer a transparent timer.

As noted above, exposing a timer value outside the timer may allow operations outside the timer to use the value. For example, a test may use the value to determine if the timer is operating properly. Here, the test may include operations which (1) initialize the timer to a certain value, (2) allow the timer to complete an update operation, (3) read the timer value and (4) compare the read timer value to an expected value to determine if the timer is operating as expected.

An opaque timer may be converted to a transparent timer in order to make certain aspects of the timer visible outside the timer. For example, the timer illustrated in FIG. 3 may be converted to the timer illustrated in FIG. 8 by adding the output port 895 in order to make the value maintained in the timer visible outside the timer. As noted above, making this value available outside the timer may make testing of the timer easier than if the value were not available.

In some situations, it may be desirable to convert certain already-existing transparent timers to opaque timers. For example, if a timer value associated with a transparent timer is not used by an operation outside the timer, the transparent timer may be a good candidate to be converted to an opaque timer. Likewise, for example, if the timer value's use by operations outside the timer does not significantly or adversely impact the operation of the system, the transparent timer may be a good candidate to be converted to an opaque timer. Converting a transparent timer to an opaque timer may make analysis and/or testing of the timer easier from the perspective that operations outside the timer may not need to be further analyzed and/or tested.

Independent of their transparency or opaqueness, timers may also be classified as ordered or unordered based on an order of operations within the timer. In an ordered timer any update operations (e.g., increment, decrement, etc.) may occur completely and consistently either before or after a test operation. In an unordered timer, the update operations and test operations may be interleaved such that some update operations may occur before the test operation and other update operations occur after the test operations.

FIG. 9 illustrates an example of an ordered timer represented in pseudo-code. The pseudo-code may represent part of an executable model that may be executed in a graphical block diagram environment. The executable model may, in turn, represent a system or a portion thereof.

Referring to FIG. 9, variable "X" is associated with the timer. Line 910 indicates the beginning of a loop that ends at line 950. At line 920, a test is performed to determine if the value of "X" is less than ten. If so, at line 930, the value of "X" is updated, which in this example is incremented by one. If "X" is not less that ten, at line 940 operations associated with "PERFORM_OPERATIONS" are performed. Note that in FIG. 9, the increment operation at line 930 is completely and consistently performed after the test operation at line 920. Therefore a timer comprising lines 920 and 930 may be considered an ordered timer.

FIG. 10 illustrates an example of an unordered timer represented in pseudo-code. The pseudo-code may represent part of an executable model that may be executed in a graphical block diagram environment. The executable model may, in turn, represent a system or a portion thereof. Referring to FIG.

10, variable "X" holds a value that is associated with the timer and variable "Y" holds a value that represents a threshold for the timer. At line 1010, the value of "Y" is initialized to zero. At line 1020, the value of "Y" is initialized to twenty. Line 1030 marks the beginning of a timer loop associated with the timer. At line 1040, the value of "X" is incremented by one. At line 1050, a test is performed to determine if the value of "X" is greater than the value of "Y". If so, at line 1060, operations associated with "PERFORM_OPERATIONS" are performed. At line 1070, the value associated with "X" is incremented by one. Line 1080 marks the end of the timer loop.

Note that in FIG. 10, the value of variable "X" is updated twice in the loop. The first update occurs at line 1040 before the test at line 1050 and the second update occurs at line 1070 after the test at line 1050. This interleaving of different types of timer-related operations makes the timer an unordered timer and may make the timer difficult to analyze and/or test.

Certain unordered timers may be rewritten into a different representation in order to make them easier to analyze and/or test. FIG. 11 illustrates an example rewriting of an unordered timer as an ordered timer. The example pseudo-code in FIG. 11 may be used to rewrite the timer in FIG. 10.

Referring to FIGS. 10 and 11, the rewriting may involve combining the update operations at lines 1040 and 1070 into a single update operation, such as the update operation at line 1140. In addition, the test operation, at line 1050, may be modified to accommodate the rewritten update operations. Line 1150 illustrates an example of how line 1050 may be rewritten.

Note that if operations in the "PERFORM_OPERATIONS" section of code were to assign new values to "X", those operations may also be modified in a manner similar to the way the above test operation was modified in order to reflect the changed value of variable "X".

In an embodiment of the invention, a section of a model may be identified as a timer after the section is converted to a different type. For example, a section of a continuous-time model may be converted to discrete time and afterwards may then be identified as a timer.

Figure 12:
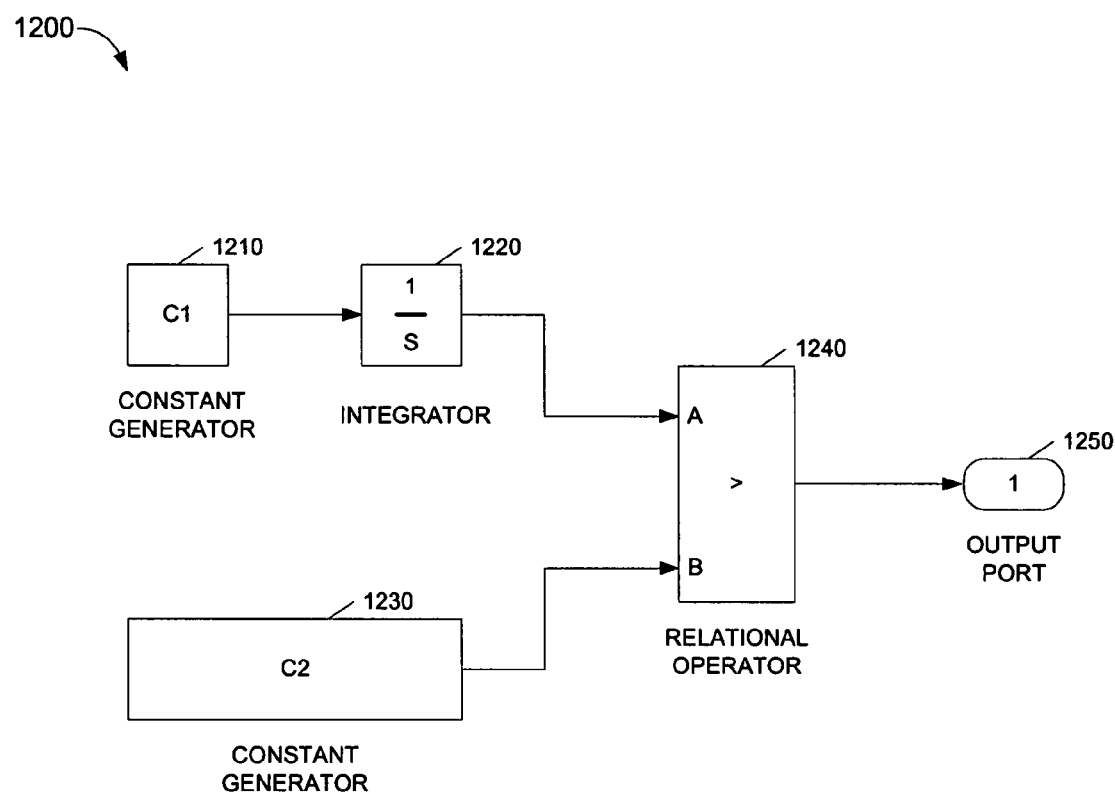
FIG. 12 illustrates an example of a section of a continuous-time model having a timer.

FIG. 12 illustrates an example of a section of a continuous-time model having a timer. Referring to FIG. 12, integrator 1220 increases its value in proportion to the output of a first constant generator 1210. The output of integrator 1220 is fed to relational operator 1240. The relational operator 1240 compares the output of the integrator 1220 with the output of a second constant generator 1230. If the output of the integrator is greater than the output of the second constant generator 1230, the relational operator 1240 outputs a logical "TRUE". Otherwise, the relational operator 1240 outputs a logical "FALSE".

Upon analysis, it may be determined that this section may be represented by a timer in a discrete time model, where the timer counts to a time corresponding to the threshold value based on the function corresponding to the integrator. As such, in one embodiment of the invention, identification of the timers may be used to transform a model or a portion of a model from continuous time to discrete time.

Figure 13:
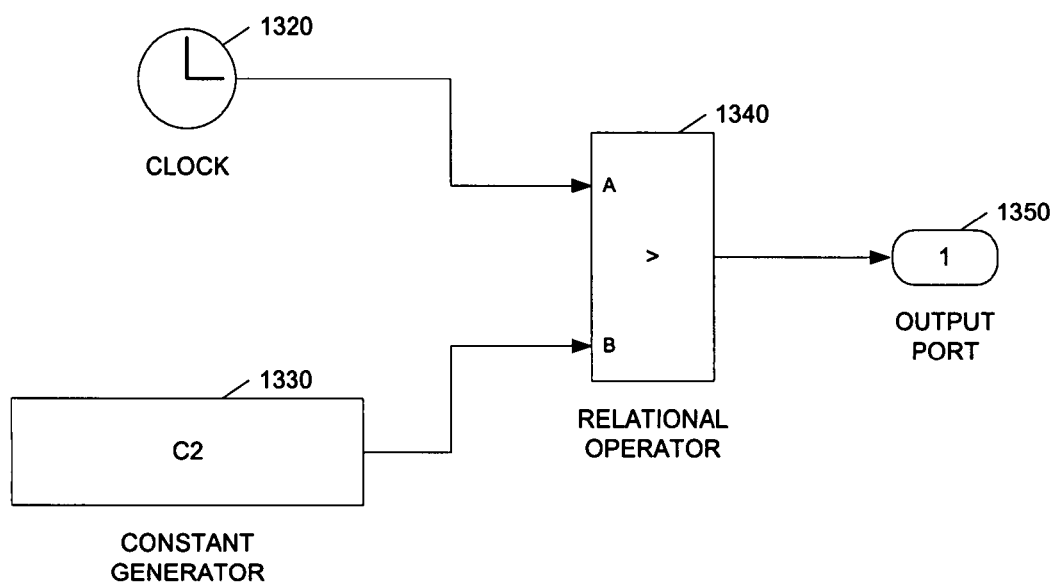
FIG. 13 illustrates an example of an implicit timer represented in a block diagram.

In another embodiment of the invention, a language in which a model is written may itself provide a timer expression. This may be identified in an implicit timer. FIG. 13 illustrates an example of an implicit timer represented in a block diagram. Referring to FIG. 13, the timer may be identified through identification of a clock 1320 being fed to a relational operator 1340 along with the output of a constant generator 1330. This design may execute at a uniform update rate, so that the output of the clock 1320 is a multiple of the same period constant.

In yet another embodiment of the invention, the language may provide some elements of a timer, but not all, and the analysis may be employed to analyze the model and locate timers by analyzing specifics of other uses of potential timer variables.

Various embodiments of the invention may apply to both imperative languages (e.g., languages that describe computation as statements that change a program state) and non-imperative languages (e.g., functional programming languages, logical programming languages, etc.). For example, in an embodiment that uses state diagrams, it may be possible to look for temporal logic operators in the diagrams that implicitly define counters. In yet another embodiment of the invention, a language of the model may have elements of timer updates and timer initializations that are broader than can be handled by a particular analysis, and so, instead of just identifying that a particular section may be a timer, it may be necessary to perform other analysis to identify whether a potential timer variable meets one or more preset restrictions.

Different embodiments may be used on various software and/or hardware systems and are not limited to the embodiments described above. These systems may include textual systems, graphical systems, combinations of graphical and textual systems, and any number of intermediate representations of systems, such as bytecode, compiler-optimized code, output of other optimizers, machine code, etc.

Figure 14:
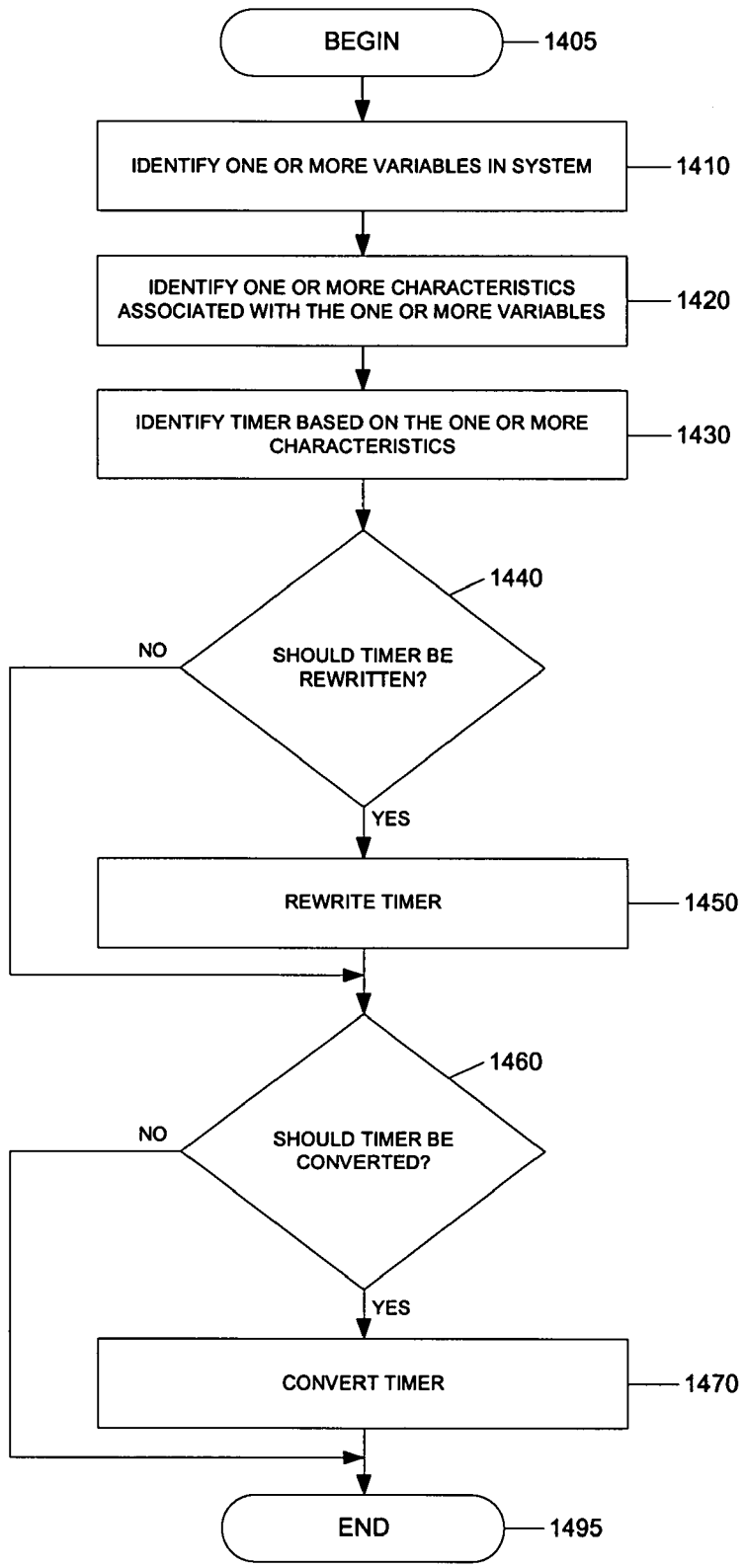
FIG. 14 illustrates a flow chart of a sequence of steps that may be used to identify and process a timer in accordance with an embodiment of the invention.

FIG. 14 illustrates a flow chart of a sequence of steps that may be used to identify and process a timer in accordance with an embodiment of the invention. The sequence begins at step 1405 and proceeds to step 1410 where one or more variables in the system are identified. The variables may be identified using static analysis techniques. For example, if the system is represented by code (e.g., C++ code, C code, pseudo-code, etc.), syntactic analysis may be employed to identify the variables.

At step 1420, one or more characteristics associated with the variable are identified. As noted above, these characteristics may include operations (e.g., assignment operations, etc.) associated with the variables. Also, as noted above, records 400 may be maintained for the variables that reflects the identified characteristics. Maintaining a record 400 for a particular variable may include indicating in the record 400 that the variable is associated with various characteristics, as described above.

At step 1430, the timer is identified based on the one or more identified characteristics. As noted above, the timer may be identified by examining the characteristics to determine if the characteristics include one or more timer-related operations. The timer may be identified based on the timer-related operations performed on a particular variable. For example, if the variable is associated with an update operation (e.g., increment, decrement, etc.), a test operation and an initialization operation, it may be determined that the variable is associated with a timer and that a timer exists in the system.

At step 1440, a check is performed to determine if the timer should be rewritten. Here, the check may include determining if the timer, in its current representation, may be rewritten to better accommodate, e.g., testing and/or analysis, as described above. In addition, the check may include, for example, determining if certain timer-related operations may be combined into a single operation. If so, the check may determine the timer should be rewritten. Moreover, the check may include, for example, determining if certain portions of code associated with timer-related operations may be rewritten to make these operations more readily apparent in the code.

During timer identification certain variables may be eliminated from consideration as being associated with a timer due to characteristics associated with the variables. For example, if one or more characteristics indicate that a variable is associated with an assignment operation in the body of a loop, it may be determined that the variable is not associated with a timer and may therefore be eliminated from further consideration as a variable associated with a timer.

If it is determined that the timer should not be rewritten, the sequence proceeds to step 1460. Otherwise, if it is determined that the timer should be rewritten, the sequence proceeds to step 1450 where the timer is rewritten. The rewriting may include combining certain timer-related operations (e.g., update operations) or rewriting the timer's representation into a notation that makes timer-related operations associated with the timer more readily apparent. In addition, the rewriting may include storing the rewritten timer in a memory of, e.g., a computer system. The memory may include, for example, a primary storage device, such as a main memory that is directly accessible to a processor in the computer system or a secondary memory, such as a disk unit.

At step 1460, a check is performed to determine if the timer should be converted. This check may involve determining if the timer is, for example, an unordered timer that can be rewritten into an ordered timer. If at step 1460, it is determined that the timer should not be converted, the sequence proceeds to step 1495. Otherwise, if it is determined that the timer should be converted, the sequence proceeds to step 1470 where the timer is converted. The conversion may involve converting the timer to a different type. For example, as noted above, an unordered timer may be converted to an ordered timer in order to better accommodate, e.g., analysis and/or testing. In addition, the conversion may include storing the converted timer in a memory of, e.g., a computer system. The memory may include, for example, a primary storage device, such as a main memory that is directly accessible to a processor in the computer system or a secondary memory, such as a disk unit. The sequence ends at step 1495.

Figure 15:
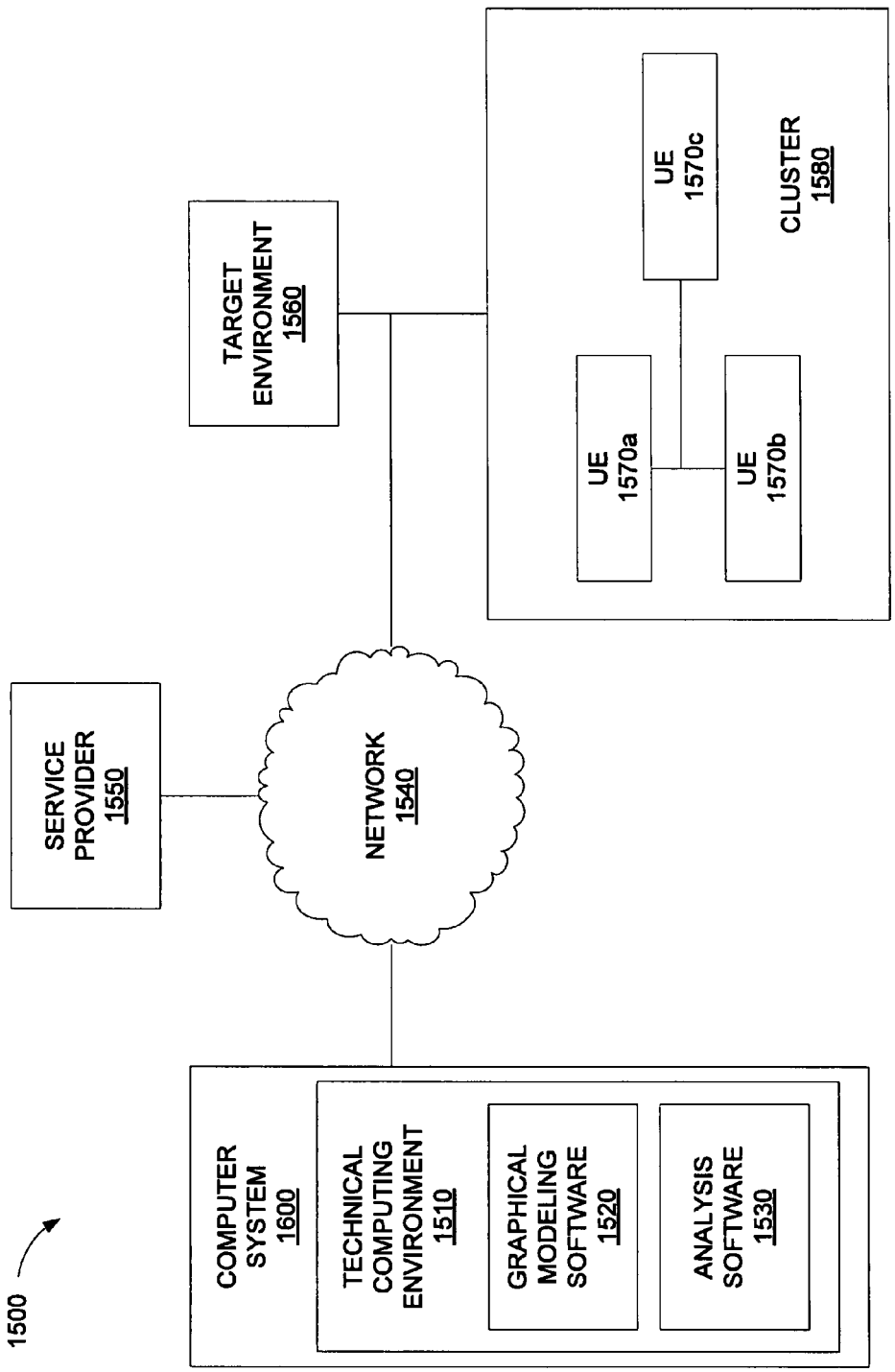
FIG. 15 illustrates an example of a distributed environment that may be configured to practice an embodiment of the invention.

It should be noted that various environments may be configured to practice embodiments of the invention. For example, FIG. 15 illustrates an example of a distributed environment 1500 that may be configured to practice an embodiment of the invention. Referring to FIG. 15, environment 1500 may include a computer system 1600, network 1540, service provider 1550, target environment 1560 and cluster 1580. Note that the distributed environment illustrated in FIG. 15 is just one example of a distributed environment that may be used with the invention. Other distributed environments that may be used with the invention may include environments that contain additional devices, fewer devices, or devices in arrangements that differ from the arrangement of environment 1500.

Computer system 1600 may include a device capable of sending and/or receiving information (e.g., data) to and/or from another device, such as target environment 1560, respectively. Computer system 1600 may be, for example, a desktop computer, a laptop computer, a client computer, a server computer, a mainframe computer, a personal digital assistant (PDA), a web-enabled cellular telephone, a smart phone, smart sensor/actuator, or another computation or communication device that executes instructions that enable the computer system 1600 to perform one or more activities and/or generate one or more results. Information as used herein, may refer to any type of machine-readable information having substantially any format that may be adapted for use, e.g., in one or more networks and/or with one or more devices. The information may include digital information and/or analog information. The information may further be packetized and/or non-packetized.

In an embodiment, computer system 1600 may include a technical computing environment (TCE) 1510. The TCE 1510 may include a graphical block diagram environment that may be used to execute models and manipulate the models in accordance with techniques described herein. In other embodiments, computer system 1600 may include other components, applications, etc. The TCE 1510 may contain computer-executable instructions (code) and data that are configured to implement the TCE. The instructions may include instructions configured to implement modeling software 1520 and/or graphical analysis software 1530. The modeling software 1520 and the analysis software 1530 may be graphical, textual or a hybrid that includes both textual and graphical capabilities/features.

The modeling software 1520 may include computer-executable instructions that allow, e.g., a user to build and/or execute a model. For example, the modeling software 1520 may allow a user to build and execute a time-based model, a state-based model, an event-based model, a dataflow-based model, etc. In an exemplary embodiment, the modeling software 1520 may be implemented using the Simulink® software. Simulink® software is available from The MathWorks, Inc., Natick, Mass.

The analysis software 1530 may include computer-executable instructions that allow information in a model to be evaluated. Evaluating a model may include generating tests for the model that satisfy model coverage and various objectives that may be user-defined. In addition, evaluating a model may include proving various model properties and generating examples of violations of these properties. Moreover, evaluating a model may include analyzing the model, in accordance with techniques described herein, to identify, rewrite and/or convert timers contained in the models. In an exemplary embodiment, analysis software 1530 may comprise the Simulink® Design Verifier software which is available from The MathWorks.

The network 1540 may include any network capable of exchanging information between entities associated with the network 1540, including, for example, the computer 1600, the service provider 1550, the target environment 1560 and the cluster 1580. The information may include, for example, packet data and/or non-packet data. Implementations of the network 1540 may include local area networks (LANs), metropolitan area networks (MANs), wide-area networks (WANs), etc. Information may be exchanged between entities using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

Network 1540 may comprise various network devices, such as routers, switches, firewalls, and/or servers. Portions of network 1540 may be wired (e.g., using wired conductors, optical fibers, etc.) and/or wireless (e.g., using free-space optical (FSO), radio frequency (RF), acoustic transmission paths, etc.). Portions of network 1540 may include a substantially open public network, such as the Internet. Portions of network 1540 may include a more restricted network, such as a virtual private network (VPN). It should be noted that implementations of networks and/or devices operating on networks described herein are not limited with regards to information carried by the networks, protocols used in the networks, the architecture/configuration of the networks, etc.

The service provider 1550 may include logic (e.g., software) that makes a service available to another device in the distributed environment 1500. The service provider 1550 may include a server operated by an entity (e.g., an individual, a corporation, an educational institution, a government agency, etc.) that provides one or more services to a destination, such as computer 1600. The services may include software containing computer-executable instructions that may be executed, in whole or in part, by a destination, by the service provider 1550 on behalf of the destination, or some combination thereof.

For example, in an embodiment, service provider 1550 may provide one or more subscription-based services that may be available to various customers. The services may be accessed by a customer via a network, such as network 1540. The customer may access the services using a computer, such as computer 1600. The service provider 1550 may limit access to certain services based on, e.g., a customer service agreement between the customer and the service provider 1550. The service agreement may allow the customer to access services that allow the customer to build and/or execute a model. In addition, the service agreement may allow the customer to further analyze models, generate code from the models, generate various reports, access audit services that allow a customer's code to be audited, etc. The service agreement may include other types of arrangements, such as certain fee-based arrangements or restricted access arrangements. For example, a customer may pay a fee which provides the customer unlimited access to a given package of services for a given time period (e.g., hourly, daily, monthly, yearly, etc.). For services not included in the package, the customer may have to pay an additional fee in order to access the services. Still other arrangements may be resource-usage based. For example, the customer may be assessed a fee based on an amount of computing resources or network bandwidth used.

Cluster 1580 may include a number of units of execution (UEs) 1570 that may perform processing on behalf of computer 1600 and/or another device, such as service provider 1550. For example, in an embodiment cluster 1580 may parallel process graphical models created by, e.g., a customer. This parallel processing may include performing analysis on the models. The UEs 1570 may reside on a single device or chip or on multiple devices or chips. For example, the UEs 1570 may be implemented in a single application specific integrated circuit (ASIC) or in multiple ASICs. Likewise, the UEs 1570 may be implemented in a single computer system or multiple computer systems. Other examples of UEs 1570 include field programmable gate arrays (FPGAs), complex programmable logic devices (CPLDs), application specific instruction-set processors (ASIPs), microprocessors, etc.

The UEs 1570 may be configured to perform operations on behalf of another entity. For example, in an embodiment, the UEs 1570 are configured to execute portions of code associated with the TCE 1510. Here, the TCE 1510 may dispatch certain activities pertaining to parallel processing activities to the UEs 1570 for execution. In another embodiment, the service provider 1550 may configure cluster 1580 to provide interactive model design capabilities to computer 1600 on a subscription basis (e.g., via a web service). For example, one interactive design capability that may be provided in a subscription may include providing support to enable computer 1600 to perform model projections from one domain (environment) to another domain (environment).

Figure 16:
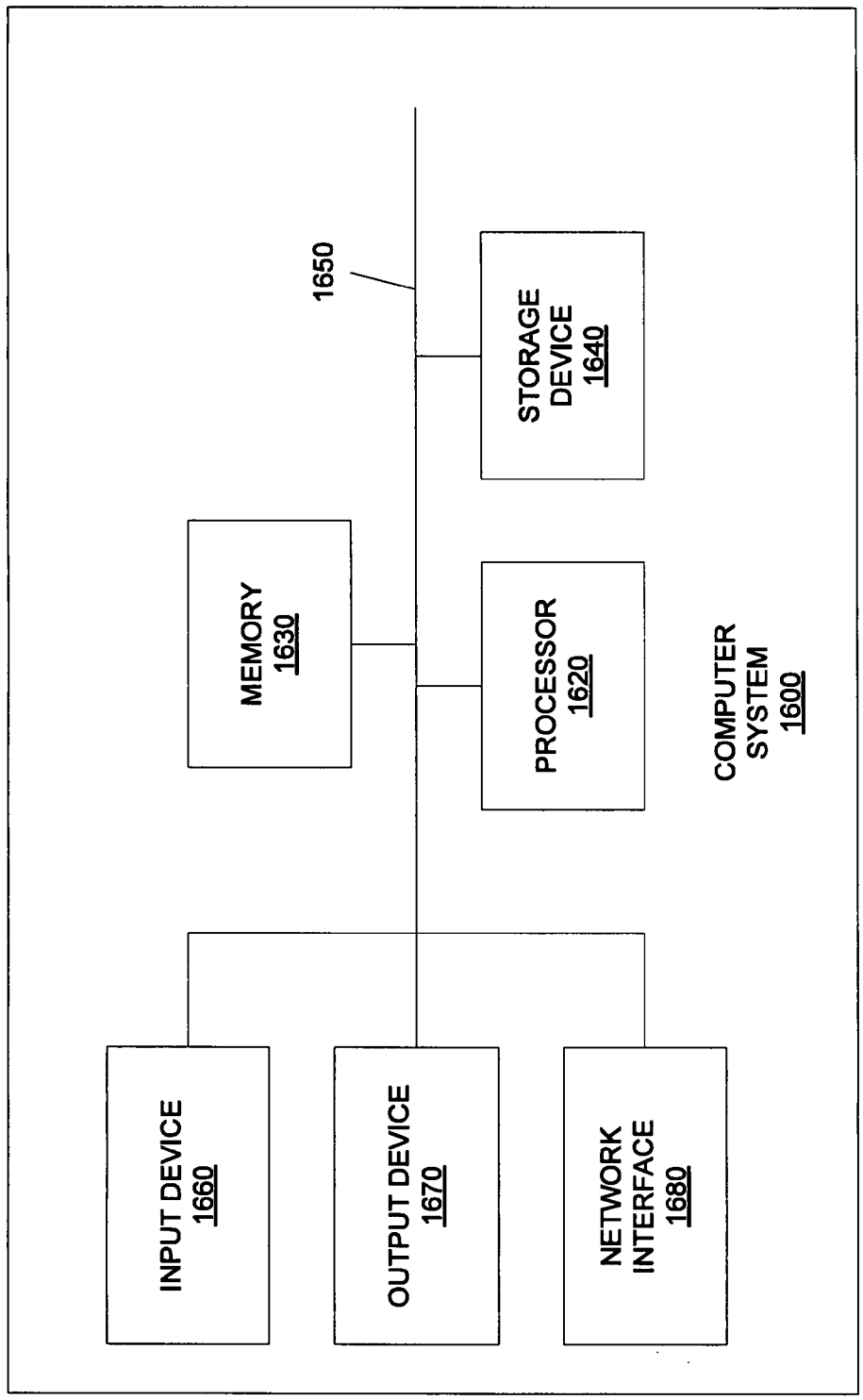
FIG. 16 illustrates an example of a computer system that may be configured to practice an embodiment of the invention.

FIG. 16 illustrates an example of a computer system 1600 that may be configured to practice an embodiment of the invention. System 1600 may include a processor 1620, an input device 1660, an output device 1670, a network interface 1680, storage device 1640 and memory 1630. The processor 1620 may include logic configured to execute computer-executable instructions configured to implement embodiments of the invention. An example of a processor that may be used with the invention includes the Pentium processor available from Intel Corporation, Santa, Clara, Calif. The instructions may reside in the memory 1630 and may include instructions associated with the TCE 1610. The memory 1630 is a computer-readable medium that may be configured to store instructions configured to implement embodiments of the invention. The memory 1630 may be a primary storage accessible to the processor 1620 am may comprise a random-access memory (RAM) that may include RAM devices, such as Dynamic RAM (DRAM) devices, flash memory devices, Static RAM (SRAM) devices, etc.

The input device 1660 may include logic configured to receive information for system 1600 from, e.g., a user. Embodiments of input device 1660 may include keyboards, touch sensitive displays, biometric sensing devices, computer mice, trackballs, pen-based point devices, etc. The output device 1670 may comprise logic configured to output information from system 1600. Embodiments of output device 1670 may include cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc.

Network interface 1680 may comprise logic configured to interface computer system 1600 with network 1540 and enable computer system 1600 to exchange information with other entities connected to the network 1540, such as, for example, service provider 1550, target environment 1560 and cluster 1580. Network interface 1680 may be implemented as a built-in network adapter, network interface card (NIC), Personal Computer Memory Card International Association (PCMCIA) network card, card bus network adapter, wireless network adapter, Universal Serial Bus (USB) network adapter, modem or any other device suitable for interfacing computer system 1600 to any type of network.

It should be noted that embodiments of the invention, maybe implemented using some combination of hardware and/or software. It should be further noted that a computer-readable medium that comprises computer-executable instructions for execution in a processor may be configured to store embodiments of the invention. The computer-readable medium may include volatile memories, non-volatile memories, flash memories, removable discs, non-removable discs and so on. In addition, it should be noted that various electromagnetic signals such as wireless signals, electrical signals carried over a wire, optical signals carried over optical fiber and the like may be encoded to carry computer-executable instructions and/or computer data that embodiments of the invention on e.g., a communication network.

The foregoing description of example embodiments of the invention provides illustration and description, but is not intended to be exhaustive or to limit the invention to the precise form disclosed. Modifications and variations are possible in light of the above teachings or may be acquired from practice of the invention.

What is claimed is:

1. A non-transitory computer-readable medium storing computer-executable instructions for execution by a processor, the computer-readable medium including one or more instructions for:

determining that one or more variables, associated with a model in a graphical modeling environment, are used in one or more timer-related operations contained in the model;

identifying a timer in the model based on the one or more variables being used in the one or more timer-related operations:

rewriting the timer into a form that is usable for testing or analysis of the model, the rewriting including incorporating one or more notations into the model that identify the one or more timer-related operations;

identifying a plurality of update operations associated with the timer; combining the identified plurality of update operations into a number of update operations that is fewer than a number of the identified plurality of update operations; and storing the rewritten timer in a memory.

2. The computer-readable medium of claim 1 wherein the computer-readable medium further stores one or more instructions for:

maintaining a record for a variable in the one or more variables, the variable being associated with one or more timer-related operations, the record comprising information about the one or more timer-related operations associated with the variable.

3. The computer-readable medium of claim 2 wherein a timer-related operation, in the one or more timer-related operations, is one of an initialization operation, an update operation, or a test operation.

4. The computer-readable medium of claim 3 wherein the update operation is one of an increment operation or a decrement operation.

5. The computer-readable medium of claim 2 wherein the model contains a loop, and wherein the variable is associated with an assignment operation in the body of the loop, and wherein the computer-readable medium further stores one or more instructions for:

indicating in the record that the variable is associated with the assignment operation in the body of the loop.

6. The computer-readable medium of claim 1 wherein the timer is in a first representation, and wherein the computer-readable medium further stores one or more instructions for:

rewriting the timer into a second representation.

7. The computer-readable medium of claim 1 wherein the timer is of a first type and wherein the computer-readable medium further stores one or more instructions for:

converting the timer from the first type to a second type.

8. The computer-readable medium of claim 7 wherein the first type is an unordered timer and the second type is an ordered timer.

9. The computer-readable medium of claim 1 wherein the analysis is static or dynamic.

10. The computer-readable medium of claim 1 wherein the analysis includes at least one of formal analysis, model checking, test generation, model coverage, or theorem proving.

11. The computer-readable medium of claim 1 wherein the one or more timer-related operations include at least one of an initialization operation, an update operation, or a test operation.

12. The computer-readable medium of claim 7 wherein the first type is at least one of a transparent timer or an opaque timer and the second type is at least one of a transparent timer or an opaque timer and wherein the first type is different from the second type.

13. A computer-implemented method comprising:

determining that one or more variables, associated with a model in a graphical modeling environment, are used in one or more timer-related operations contained in the model;

identifying a timer in the model based on the one or more variables being used in the one or more timer-related operations:

rewriting the timer into a form that is usable for testing or analysis of the model, the rewriting including incorporating one or more notations into the model that identify the one or more timer-related operations;

identifying a plurality of update operations associated with the timer; combining the identified plurality of update operations into a number of update operations that is fewer than a number of the identified plurality of update operations; and storing the rewritten timer in a memory.

14. The method of claim 13 further comprising:

maintaining a record for a variable in the one or more variables, the record comprising information about one or more timer-related operations associated with the variable.

15. The method of claim 14 wherein the variable is associated with an assignment operation in a body of a loop associated with the model, and wherein maintaining further comprises:

indicating in the record that the variable is associated with the assignment operation in the body of the loop.

16. The method of claim 13 wherein the timer is in a first representation, and wherein rewriting further comprises:

rewriting the timer into a second representation.

17. The method of claim 13 wherein the timer is of a first type and wherein converting further comprises:

converting the timer from the first type to a second type.

18. The method of claim 13 wherein the analysis is static or dynamic.

19. The method of claim 13 wherein the analysis includes at least one of formal analysis, model checking, test generation, model coverage, or theorem proving.

20. The method of claim 17 wherein the first type is an unordered timer and the second type is an ordered timer.

21. The method of claim 17 wherein the first type is at least one of a transparent timer or an opaque timer and the second type is at least one of a transparent timer or an opaque timer and wherein the first type is different from the second type.

22. An apparatus comprising:

means for determining that one or more variables, associated with a model in a graphical modeling environment, are used in one or more timer-related operations contained in the model;

means for identifying a timer in the model based on the one or more variables being used in the one or more timer-related operations:

means for rewriting the timer into a form that is usable for testing or analysis of the model, the rewriting including incorporating one or more notations into the model that identify the one or more timer-related operations;

means for identifying a plurality of update operations associated with the timer;

means for combining the identified plurality of update operations into a number of update operations that is fewer than a number of the identified plurality of update operations; and means for storing the rewritten timer in a memory.

23. The apparatus of claim 22 wherein the timer is of a first type and wherein the apparatus further comprises:

means for converting the timer from the first type to a second type.

24. The apparatus of claim 23 wherein the first type is an unordered timer and the second type is an ordered timer.

25. The apparatus of claim 23 wherein the first type is at least one of a transparent timer or an opaque timer and the second type is at least one of a transparent timer or an opaque timer and wherein the first type is different from the second type.

26. A system comprising:
a memory; and
a processor to:
determine that one or more variables, associated with a model in a graphical modeling environment, are used in one or more timer-related operations contained in the model,
identify a timer in the model based on the one or more variables being used in the one or more timer-related operations,
rewrite the timer into a form that is usable for testing or analysis of the model, the rewriting including incorporating one or more notations into the model that identify the one or more timer-related operations,
identify a plurality of update operations associated with the timer;
combine the identified plurality of update operations into a number of update operations that is fewer than a number of the identified plurality of update operations; and
store the rewritten timer in the memory.

27. The system of claim 26 wherein the timer is of a first type and wherein the processor is further configured to:
convert the timer from the first type to a second type.

28. The system of claim 27 wherein the first type is an unordered timer and the second type is an ordered timer.

29. The system of claim 27 wherein the first type is at least one of a transparent timer or an opaque timer and the second type is at least one of a transparent timer or an opaque timer and wherein the first type is different from the second type.

30. A non-transitory computer-readable medium storing computer-executable instructions for execution by a processor, the computer-readable medium storing one or more instructions for:
identifying a timer contained in a portion of an executable model, the timer being identified by one or more timer-related operations associated with the portion of the executable model; and
modifying the timer to make the timer analyzable or testable in an analysis or test of the executable model, the modifying including:
incorporating one or more notations into the model that identify the one or more timer-related operations;
converting the timer from an unordered timer to an ordered timer;
identifying a plurality of update operations associated with the timer; and
combining the identified plurality of update operations into a number of update operations that is fewer than a number of the identified plurality of update operations.

31. The computer-readable medium of claim 30 wherein the portion of the model is continuous-time based, and wherein the computer-readable medium further stores one or more instructions for:
converting the portion of the model from being continuous-time based to being discrete-time based.

32. A non-transitory computer-readable medium storing computer-executable instructions for execution by a processor, the computer-readable medium storing one or more instructions for:
determining that one or more variables, associated with a model in a graphical modeling environment, are used in one or more timer-related operations contained in the model;
identifying a timer in the model based on the one or more variables being used in the one or more timer-related operations: and
rewriting the one or more timer-related operations to accommodate an analysis or test of the model, the rewriting including:
incorporating one or more notations into the model that identify the one or more timer-related operations,
converting the timer from an unordered timer to an ordered timer,
identifying a plurality of update operations associated with the timer and combining the identified plurality of update operations into a number of update operations that is fewer than a number of the identified plurality of update operations.

* * * * *

UNITED STATES PATENT AND TRADEMARK OFFICE
CERTIFICATE OF CORRECTION

PATENT NO. : 8,260,602 B1  
APPLICATION NO. : 11/982289  
DATED : September 4, 2012  
INVENTOR(S) : Gregoire Hamon It is certified that error appears in the above-identified patent and that said Letters Patent is hereby corrected as shown below:

On the Title page, Item (73) the Assignee "The Math Works, Inc., Natick, MA" should read --The MathWorks, Inc., Natick, MA--.

Signed and Sealed this  
Thirteenth Day of November, 2012

David J. Kappos  
*Director of the United States Patent and Trademark Office*